(12) United States Patent
Greene (10) Patent No.: US 9,508,253 B1
(45) Date of Patent: Nov. 29, 2016

(54) SYSTEMS AND METHODS FOR PROGRAMMING A REMOTE CONTROL DEVICE

(71) Applicant: EchoStar Technologies L.L.C., Englewood, CO (US)

(72) Inventor: Gregory Greene, Littleton, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 14/965,740

(22) Filed: Dec. 10, 2015

(51) Int. Cl.
*G08C 17/02* (2006.01)
*G08C 23/04* (2006.01)

(52) U.S. Cl.
CPC ............... *G08C 17/02* (2013.01); *G08C 23/04* (2013.01); *G08C 2201/21* (2013.01); *G08C 2201/30* (2013.01)

(58) Field of Classification Search
CPC ............... G05B 19/00; G05B 19/045; H04N 21/42226; H04N 2005/4435; G08C 17/02; G08C 2201/92; G08C 2201/20; G08C 2201/21
See application file for complete search history.

(56) References Cited

U.S. PATENT DOCUMENTS

2008/0174468 A1 * 7/2008 Drimusz ............... G08C 19/28
341/176
2010/0039282 A1 2/2010 Hostage et al.

* cited by examiner

*Primary Examiner* — Curtis Odom
(74) *Attorney, Agent, or Firm* — Seed IP Law Group LLP (57) ABSTRACT

A method for programming a first remote control device associated with a first electronic device that includes receiving, by the first electronic device, a first electronic command signal issued from a second remote control device. The first electronic command signal includes a key code indicative of a first key entry on the second remote control device. The first electronic device accesses a key code database, which stores a plurality of key code sets, and each of the plurality of key code sets has a plurality of key codes for controlling at least one electronic device. The first electronic device compares the received first key code to the key code database to identify matching key code sets including the first key code. The first electronic device analyzes the matching key code sets to identify a preferred next key entry, and prompts a user of the second remote control device to press a key on the second remote control device corresponding to the identified preferred next key entry.

20 Claims, 5 Drawing Sheets

Key Code Sets

| | | 510 | | | 520 | | | 530 | |
|---|---|---|---|---|---|---|---|---|---|
| | TV1 | TV2 | TV3 | A1 | A2 | A3 | D1 | D2 | D3 |
| Channel Up | 0001 | 0010 | 0001 | — | — | — | — | — | — |
| Channel Down | 0100 | 0011 | 0100 | — | — | — | — | — | — |
| Volume Up | 0110 | 0110 | 0101 | 0101 | 0110 | 0101 | 0110 | 0101 | 0101 |
| Volume Down | 0111 | 0111 | 0111 | 0110 | 0111 | 0111 | 0101 | 0110 | 0111 |
| Play | — | — | — | 1000 | 1001 | 1001 | 1011 | 1000 | 1001 |
| Pause | — | — | — | 1100 | 1100 | 1101 | 1101 | 1011 | 1100 |
| Next Track | — | — | — | 1110 | 1111 | 1101 | — | — | — |
| Previous Track | — | — | — | 1111 | 1110 | 1111 | — | — | — |

110

540

SYSTEMS AND METHODS FOR PROGRAMMING A REMOTE CONTROL DEVICE

BACKGROUND

1. Technical Field

This disclosure generally relates to systems and methods for programming a remote control device and, more particularly, to systems and methods for programming a remote control device associated with a first electronic device to control a second electronic device.

2. Description of the Related Art

Remote control devices are often provided with a wide variety of electronic devices, such as televisions, audio receivers, DVD players and the like, in order to remotely control the operation of the associated electronic device. Each electronic device typically includes a "native" remote control device, which is programmed with a particular set of key codes for controlling the particular associated electronic device. For example, a Sony brand television will typically be sold along with an accompanying remote control, which is programmed to only control the associated Sony television of a particular model.

Many consumers have a more than a single electronic device within a room of their home, and many such electronic devices may be interconnected to provide a "multimedia" or "home theater" experience at home. For example, it is common to have a cable or satellite receiver set-top-box that is connected to a television set, which may further be connected to an audio receiver or sound system, as well as a DVD player or a DVR system. Accordingly, it is desirable to have a single remote control that is programmed to control more than one, or even all, of the electronic devices within such a room.

So-called "universal remote controllers" allow a user to program a single remote control device to control more than one electronic device, such as a television and a sound system. However, programming a universal remote controller typically involves either manually entering identifying information about the electronic device to be controlled (such as, for example, the manufacturer and/or model of the device), or looking up (based on the manufacturer and/or model of the device) and then manually entering one or more programming codes. This process can be complex, time-consuming and may be too complicated for individuals lacking a certain degree of technical know-how.

There is thus a need for improved systems and methods for programming remote control devices in this, as well as a variety of other, applications.

BRIEF SUMMARY

A method for programming a first remote control device associated with a first electronic device is provided that may be summarized as including receiving, by the first electronic device, a first electronic command signal issued from a second remote control device, the first electronic command signal including a key code indicative of a first key entry on the second remote control device, the second remote control device being associated with a second electronic device; accessing, by the first electronic device, a key code database, the key code database storing a plurality of key code sets, each of the plurality of key code sets having a plurality of key codes for controlling at least one electronic device; comparing, by the first electronic device, the received first key code to the key code database to identify matching key code sets including a first key code; analyzing, by the first electronic device, the matching key code sets to identify a preferred next key entry; and prompting a user of the second remote control device to press a key on the second remote control device corresponding to the identified preferred next key entry.

The first electronic device may be a set-top box. The second electronic device may be one of a television, an audio or video receiver, a digital video recorder (DVR) or a digital video disc (DVD) player.

The method may further include receiving, by the first electronic device, a second electronic command signal issued from the second remote control device, the second electronic command signal including a key code indicative of the next key entry on the second remote control device; determining, by the first electronic device, whether a key code set associated with the second remote control device is uniquely identifiable based on the received first and next key entries; and if the key code set associated with the second remote control device is uniquely identifiable, programming the first remote control device to include the key code set associated with the second remote control device.

If the key code set associated with the second remote control device is not uniquely identifiable, the method may further include analyzing, by the first electronic device, the matching key code sets to identify a preferred second next key entry; and prompting the user of the second remote control device to press a key on the second remote control device corresponding to the identified preferred second next key entry.

The method may further include entering, by the first electronic device, a discovery mode, wherein in the discovery mode the first electronic device acknowledges electronic command signals issued from the second remote control device. Entering, by the first electronic device, a discovery mode may include automatically entering the discovery mode upon receiving a predetermined number of electronic command signals from the second remote control device within a predetermined period of time. In another embodiment, entering, by the first electronic device, a discovery mode may include receiving, by the first electronic device, a discovery mode initiation command signal from the first remote control device.

In another embodiment, a remote control programming system may include a first remote control device associated with a first electronic device, and a second remote control device associated with a second electronic device. The first electronic device may be configured to receive a first electronic command signal issued from the second remote control device, the first electronic command signal including a key code indicative of a first key entry on the second remote control device; access a key code database, the key code database storing a plurality of key code sets, each of the plurality of key code sets having a plurality of key codes for controlling at least one electronic device; compare a received first key code to the key code database to identify matching key code sets including the first key code; analyze the matching key code sets to identify a preferred next key entry; and prompt a user of the second remote control device to press a key on the second remote control device corresponding to the identified preferred next key entry.

The first electronic device may be a set-top box. The second electronic device may be one of a television, an audio or video receiver, a digital video recorder (DVR) or a digital video disc (DVD) player.

The first electronic device may be further configured to receive a second electronic command signal issued from the second remote control device, the second electronic command signal including a key code indicative of the next key entry on the second remote control device; determine whether a key code set associated with the second remote control device is uniquely identifiable based on the received first and next key entries; and if the key code set associated with the second remote control device is uniquely identifiable, program the first remote control device to include the key code set associated with the second remote control device.

If the key code set associated with the second remote control device is not uniquely identifiable, the first electronic device may be further configured to analyze the matching key code sets to identify a preferred second next key entry; and prompt the user of the second remote control device to press a key on the second remote control device corresponding to the identified preferred second next key entry.

The first electronic device may be further configured to enter a discovery mode, wherein in the discovery mode the first electronic device acknowledges electronic command signals issued from the second remote control device. The first electronic device may be configured to automatically enter the discovery mode upon receiving a predetermined number of electronic command signals from the second remote control device within a predetermined period of time. In another embodiment, the first electronic device may be configured to enter the discovery mode upon receiving a discovery mode initiation command signal from the first remote control device.

In another embodiment, a non-transitory computer-readable storage medium may include computer executable instructions that, when executed by at least one computer processor of a first electronic device associated with a first remote control device, causes the following to be performed: receiving, by the first electronic device, a first electronic command signal issued from a second remote control device, the first electronic command signal including a key code indicative of a first key entry on the second remote control device, the second remote control device being associated with a second electronic device; accessing, by the first electronic device, a key code database, the key code database storing a plurality of key code sets, each of the plurality of key code sets having a plurality of key codes for controlling at least one electronic device; comparing, by the first electronic device, a received first key code to the key code database to identify matching key code sets including the first key code; analyzing, by the first electronic device, the matching key code sets to identify a preferred next key entry; and prompting a user of the second remote control device to press a key on the second remote control device corresponding to the identified preferred next key entry.

The computer executable instructions, when executed by the at least one computer processor, may further cause the following to be performed: receiving, by the first electronic device, a second electronic command signal issued from the second remote control device, the second electronic command signal including a key code indicative of the next key entry on the second remote control device; determining, by the first electronic device, whether a key code set associated with the second remote control device is uniquely identifiable based on the received first and next key entries; and if the key code set associated with the second remote control device is uniquely identifiable, programming the first remote control device to include the key code set associated with the second remote control device.

The computer executable instructions, when executed by the at least one computer processor, may further cause the following to be performed if the key code set associated with the second remote control device is not uniquely identifiable: analyzing, by the first electronic device, the matching key code sets to identify a preferred second next key entry; and prompting the user of the second remote control device to press a key on the second remote control device corresponding to the identified preferred second next key entry.

The computer executable instructions, when executed by the at least one computer processor, may further cause the following to be performed: entering, by the first electronic device, a discovery mode, wherein in the discovery mode the first electronic device acknowledges electronic command signals issued from the second remote control device.

BRIEF DESCRIPTION OF THE SEVERAL VIEWS OF THE DRAWINGS

In the drawings, identical reference numbers identify identical elements or elements in the same group and class. The sizes and relative positions of elements in the drawings are not necessarily drawn to scale. For example, the shapes of various elements and angles are not necessarily drawn to scale, and some of these elements are enlarged and positioned to improve drawing legibility.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. Well-known structures and methods associated with media content delivery have not been shown or described in detail to avoid unnecessarily obscuring descriptions of the preferred embodiments.

Unless the context requires otherwise, throughout the specification and claims which follow, the word "comprise" and variations thereof, such as, "comprises" and "comprising" are to be construed in an open, inclusive sense, for example "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. The term "or" is generally employed in its sense including "and/or" unless the content clearly dictates otherwise.

The headings and Abstract of the Disclosure provided herein are for convenience only and do not interpret the scope or meaning of the embodiments.

Figure 1:
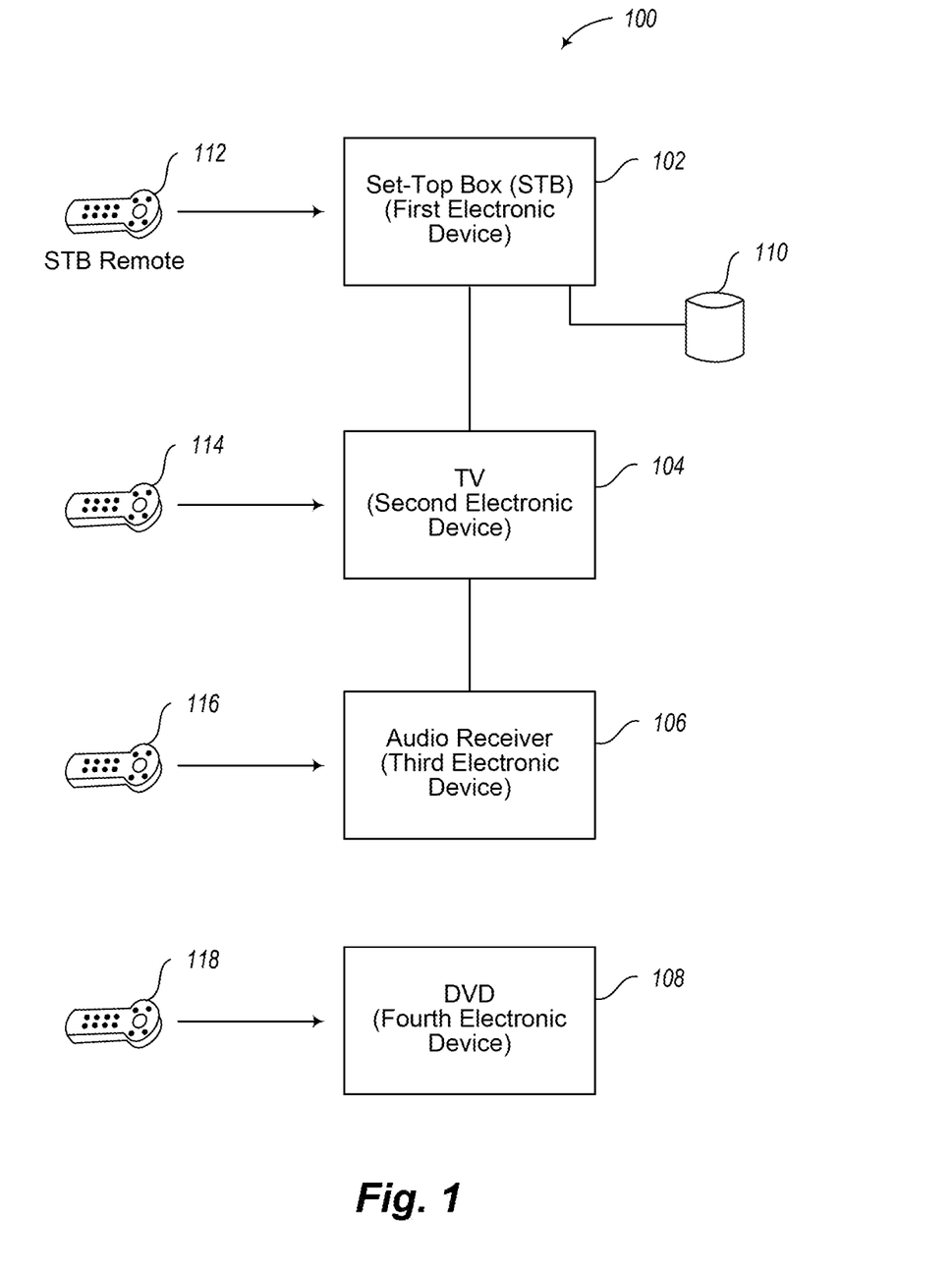
FIG. 1 is a block diagram illustrating a remote control programming system, according to one embodiment.

FIG. 1 is an overview block diagram illustrating a remote control programming system 100 according to one embodiment. It is to be appreciated that FIG. 1 illustrates one example of a remote control programming system 100 and that the various embodiments discussed herein are not limited to the exemplary system of FIG. 1. The system 100 may include a variety of communication systems and may use a variety of communication media including, but not limited to, satellite wireless media, cable media or any media over which communication of broadcast television programming, on-demand programming, and/or streaming media may occur, and/or over which Internet communication may occur.

The system 100 includes a first electronic device 102 and a second electronic device 104. The system 100 may further include a third electronic device 106 and a fourth electronic device 108, as shown in FIG. 1. It should be appreciated that the system 100 may include any number of additional electronic devices which may be controlled by a remote controller as provided in this disclosure.

The electronic devices 102, 104, 106, 108 may be any device capable of being controlled by way of a remote control device, such as a cable or satellite television receiver ("set-top box"), television, audio/video receiver, a digital video recorder (DVR), a DVD player, and the like. As shown in the exemplary system 100 of FIG. 1, the first electronic device 102 may be a set-top box, the second electronic device 104 may be a television, the third electronic device 106 may be an audio receiver or stereo system, and the fourth electronic device 108 may be a DVD player.

Each of the electronic devices 102, 104, 106, 108 have an associated remote control device, which may be any remote control unit, such as a handheld device, capable of transmitting commands initiated by a user for controlling an associated electronic device. A first remote control device 112 is associated with the first electronic device 102. A second remote control device 114 is associated with the second electronic device 104. A third remote control device 116 is associated with the third electronic device 106. And, a fourth remote control device 118 is associated with the fourth electronic device 108. The remote control devices 112, 114, 116, 118 may be, for example, remote controllers provided by a manufacturer of the respective associated electronic devices 102, 104, 106, 108. Accordingly, the remote control devices 112, 114, 116, 118 are pre-programmed with key codes for controlling their respective associated electronic devices 102, 104, 106, 108. Key codes are encoded commands which are transmitted to an associated electronic device when a user pushes a key or button on a remote control device. For example, when a user pushes a "volume up" button on a television remote control, the remote control transmits a signal that includes an encoded command, or key code, instructing the television to increase the volume. The television receives the signal, interprets the key code and executes the command (e.g., turns up the volume).

The first electronic device 102, which may be, for example, a set-top box, is communicatively coupled with a universal key code database 110. The universal key code database 110 is stored in a non-transitory computer-readable memory which may be located within the first electronic device 102 and/or located external to and electronically accessible by (e.g., via one or more wired and/or wireless communication networks) the first electronic device 102. The universal key code database 110 stores key codes or key code sets for remote control operation of various electronic devices. For example, the universal key code database 110 may contain key codes associated with all manufacturers and models of televisions, audio/video receivers, DVRs, DVD players and so on. The universal key code database 110 may be periodically updated, for example through wired and/or wireless communication with manufacturer or third-party key code databases, such that the universal key code database 110 contains key codes for the most recent commercially available electronic devices, as well as for older, but still in-use, models.

The first electronic device 102, as well as any other devices shown in FIG. 1 and/or other devices or systems described herein, may include at least one computer processor coupled to at least one non-transitory memory, and is configured to execute computer-executable instructions to carry out, enable and/or otherwise perform applicable actions described herein of the system 100 and the different embodiments described herein.

Figure 2:
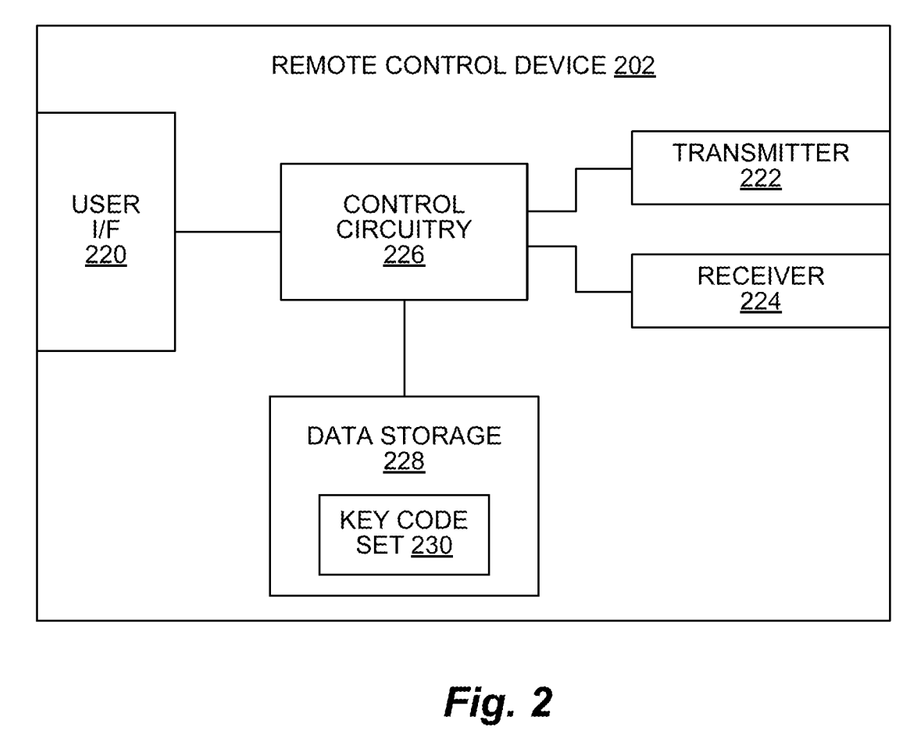
FIG. 2 is a block diagram illustrating a remote control device, according to one or more embodiments.

FIG. 2 is a block diagram illustrating a remote control device 202 according to one or more embodiments. The remote control device 202 employs wireless signals to both transmit communications to and receive communications from an electronic device to be controlled or operated, such as a satellite, cable or terrestrial ("over-the-air") television set-top box. For example, the remote control device 202 may be the first remote control device 112 shown in FIG. 1, and may be configured to operate or control the first electronic device 102, which may be a set-top box. Such devices receive audio/video programming, such as movies, sporting events, news programs, and other forms of audio/video information and entertainment, and present the programming to a user as directed by the user via the remote control device 202. Other types of electronic devices, such as digital video recorders (DVRs), televisions, audio receivers, DVD players and the like may be controlled by way of an associated remote control device 202.

Each of the remote control devices 112, 114, 116, 118 may include any or all of the features of the remote control device 202 shown in FIG. 2, and discussed in further detail below.

The remote control device 202 includes a user interface 220, a transmitter 222, a receiver 224, control circuitry 226 and data storage 228. In some implementations, a dual-function transceiver may be employed instead of separate transmitter 222 and receiver 224 components. Other components may also be incorporated within the remote control device 202, as will be readily understood by those skilled in the relevant field.

The user interface 220 is configured to receive user input for transmitting commands to an associated electronic device. In one example, the user interface 220 includes multiple keys or buttons that the user may press to initiate the commands. Such keys may include numeric keys for inputting program channel numbers and other information, directional (e.g., "up," "down," "left" and "right") keys for menu item selection and other functions, and other special-purpose buttons (e.g., "volume up," "channel down," "pause," "rewind," "input" and so on). In another example, the user interface 220 may include a touchpad, a mouse, a joystick, a free-space position-sensing system, such as a gyroscope or accelerometer, or similar positioning device to allow a user to move a cursor or other indicator on a display. The keys or buttons provided on the remote control device 202 may be physical keys or buttons, or may be graphically displayed icons which may be selected utilizing a touch screen, mouse, or the like. Various types of user input mechanisms may be employed in a user interface 320 in other examples.

The control circuitry 226 is configured to generate the desired command in response to the user input received by way of the user interface 220, as well as to control other aspects of the remote control device 202 as described in greater detail hereinafter. The control circuitry 226 may include one or more processors, such as a microprocessor, microcontroller, or digital signal processor (DSP), configured to execute instructions directing the processor to perform the functions discussed more fully below. The control circuitry 226 may also include memory or data storage adapted to contain such instructions. In another implementation, the control circuitry 226 may be strictly hardware-based logic, or may include a combination of hardware, firmware and/or software elements.

The transmitter 222 is configured to transmit the commands generated by the control circuitry 226 (e.g., in response to a user's button or key push) to an associated electronic device to be controlled. In one example, the transmitter 222 is a radio frequency (RF) transmitter configured to transmit RF signals carrying the commands generated by the control circuitry 226 utilizing protocols such as Bluetooth®, Wi-Fi, ZigBee® and the like. In other examples, the transmitter 222 may be an infrared (IR) transmitter, or may employ another wireless communication technology.

Similarly, the receiver 224 is configured to receive command acknowledgments, replies and other communications from an associated electronic device by way of wireless communication signals. The control circuitry 226 may then process these communications to determine or direct subsequent operations of the remote control device 202. In one example, the receiver 224 is configured to receive communication signals of the same wireless technology as that employed by the transmitter 222, such as RF or IR communication signals.

Also included in the remote control device 202 is non-transitory, computer-readable data storage 228 configured to store key codes 230 for controlling and operating one or more associated electronic devices (e.g., electronic devices 102, 104, 106, 108 shown in FIG. 1). For example, the first remote control device 112 may contain a set of key codes 230, with each key code within the key code set 230 being associated with a button or key on the remote control device 112. Thus, when a user presses a button on the remote control device 112 (e.g., "volume up"), the key code associated with that button-press is encoded in an electronic signal that is transmitted as a command from the remote control device 112 to the associated first electronic device 102. Upon receipt of the transmitted command, the first electronic device 102 performs the commanded action (e.g., increases the volume of the first electronic device 102).

In one embodiment, the data storage 228 is non-volatile data storage, such as flash memory, thus allowing a power source of the remote control device 202, such as a battery (not shown in FIG. 2) to be removed while preserving the stored key codes 230. Other forms of data storage 228, volatile and/or non-volatile, may be utilized in other implementations. Further, the data storage 228 may be incorporated within the control circuitry 226, or may be provided as a standalone device, depending on the implementation.

Figure 3:
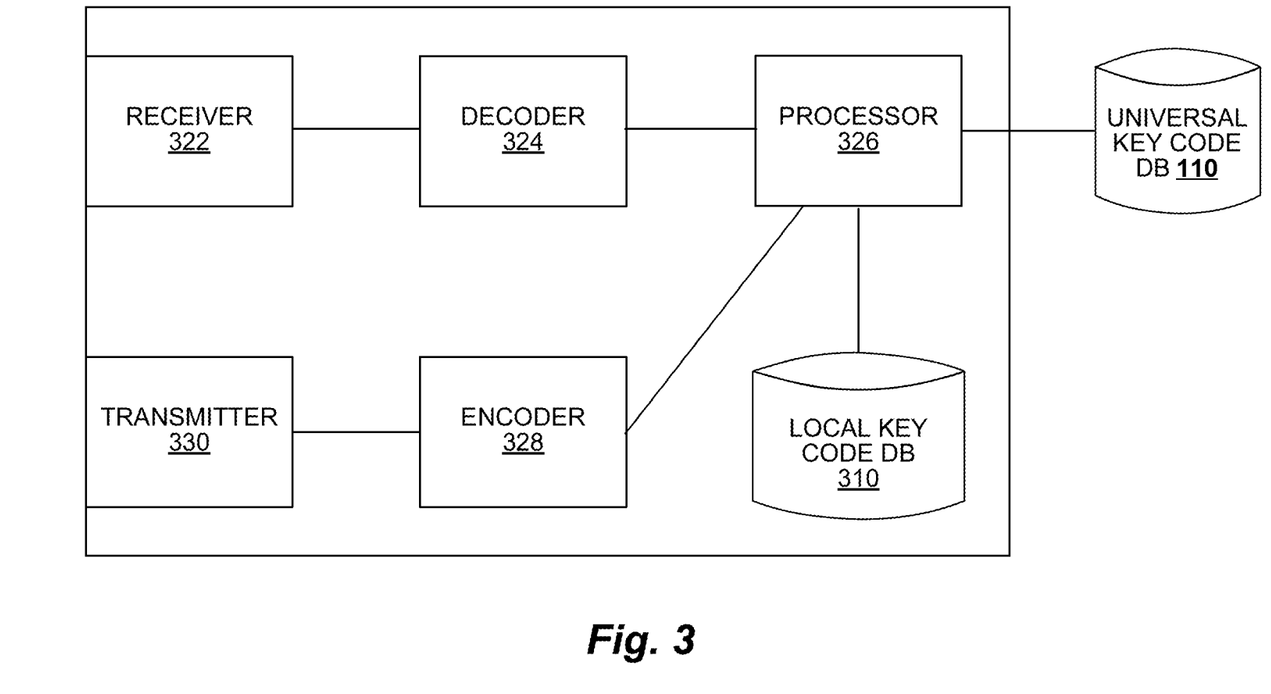
FIG. 3 is a block diagram illustrating further details of a first electronic device, including some of the internal circuitry and components, in accordance with one or more embodiments.

FIG. 3 is a block diagram illustrating further details of the first electronic device 102, including some of the internal circuitry and components, in accordance with one or more embodiments. The device 102, which may be a set-top box, includes a signal receiver 322, a signal decoder 324, a processor 326, a signal encoder 328 and a signal transmitter 330. The device 102 may further include a universal key code database 110 (also shown in FIG. 1), which may be stored in non-transitory computer-readable memory within the device 102, or alternatively may be stored on one or more devices (such as one or more servers) and electronically accessible to the device 102 over one or more communication networks. Further, the first electronic device 102 may include or otherwise access a local key code database 310 storing key codes for remote control operation of the first electronic device 102 (e.g., via associated remote control device 112).

The signal decoder 324 and/or the signal encoder 328 may be or include one or more modules stored in non-transitory computer-readable memory within or accessible by the processor 326. Additionally or alternatively, the signal decoder 324 and/or the signal encoder 328 may be any combination of circuitry, hardware, software, firmware or the like for decoding and encoding remote control electronic signals and which are electronically accessible by the processor 326.

The first electronic device 102 may include various other components for normal operation of the first electronic device 102, as will be readily appreciated by those having ordinary skill in the relevant field. For example, the first electronic device 102 may be a set-top box, and may include components for receiving satellite- and/or cable-provided program content, causing a connected display device (such as a television or computer monitor) to display user-selected program content, providing a channel guide menu for selecting a channel to display, and the like.

In one or more embodiments, the first electronic device 102 (e.g., a set-top box) is configured to receive an electronic command signal issued from a non-associated, second remote control device (e.g., remote control device 114, which is associated with the television 104). The electronic command signal indicates a key or button entry on the non-associated, second remote control device and includes, for example, one or more encoded key codes. For example, a user of the second remote control device may press a "channel up" key or button, and an electronic command signal including a key code corresponding to the command "channel up" is transmitted to the first electronic device 102. The signal is received by the signal receiver 322 and decoded by the signal decoder 324.

Once the key code received from the second remote control device 114 is received and decoded, the first electronic device 102 will search in its own memory or the universal key code database 110 to identify a key code set associated with the second electronic device 104 (i.e., a television set associated with and controlled by the second remote control device 114). That is, the first electronic device 102 queries a database, such as the universal key code database 110 or another database in a memory, in order to uniquely identify a key code set used for controlling the second electronic device 104 (e.g., a television). When a key code set associated with the second electronic device 104 is identified, the first electronic device 102 programs the first remote control device 112 with the identified key code set for the second electronic device 104. That is, the first electronic device 102 encodes the identified key code set, using the signal encoder 328, and transmits to the first remote control device 112, via the signal transmitter 330, the encoded key code set for controlling the second electronic device 104. The transmitted key code set is then received by the first remote control device 112 and stored, for example, in data storage 228. As such, the first remote control device 112 contains the key code set for remote controlling the second electronic device 104, in addition to the native key code set for controlling the associated first electronic device 102.

Uniquely identifying a key code set for controlling a corresponding electronic device (e.g., a television, DVD player, DVR, audio receiver or the like) may require receiving more than a single key code from the remote control device associated with the electronic device. That is, a single key or button press may not provide enough information to identify the particular key code set for controlling an associated television, DVD player, DVR, audio receiver or the like. In such a case, the first electronic device 102, upon querying the universal key code database 110 and identifying, for example, multiple key codes sets containing a key code matching the key code received from the second remote control device 112, will prompt the user to press additional and/or different keys on the second remote control device 112. By receiving additional and/or different key codes from the second remote control device 112, the first electronic device 102 will eliminate non-matching key code sets, and this process is repeated until a single or unique key code set has been identified for controlling the second electronic device 104.

Figure 4:
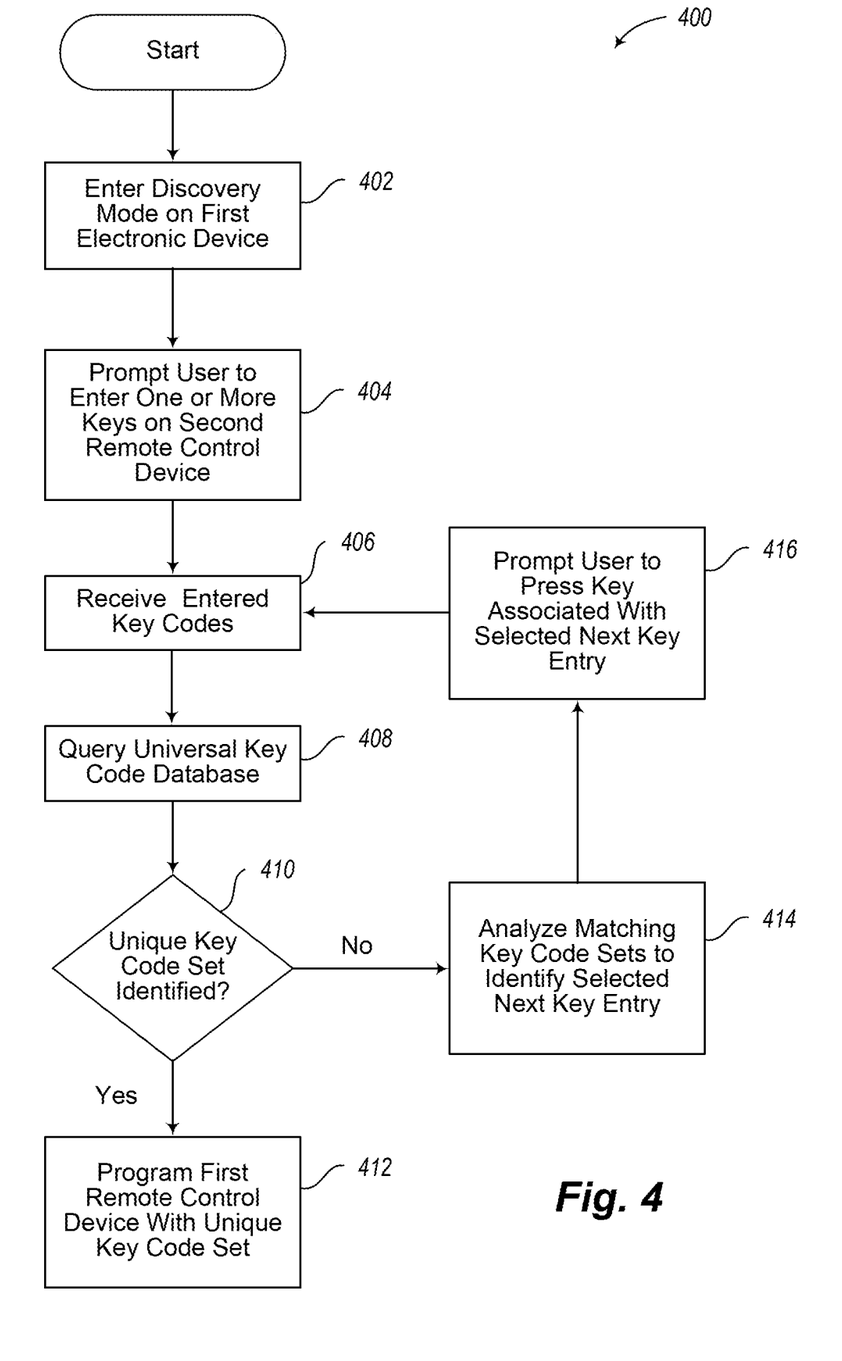
FIG. 4 is a flowchart illustrating a process for programming a first remote control device, associated with a first electronic device, to control a second electronic device, in accordance with one or more embodiments.

FIG. 4 is a flowchart illustrating a process 400 for programming a first remote control device 112, associated with a first electronic device 102, to control a second electronic device 104. At block 402, the first electronic device 102 enters a "discovery mode." This may be accomplished, for example, by pressing a key or button on the first remote control device 112 to cause the first electronic device 102 to enter a key code discovery mode. In the discovery mode, the first electronic device 102 knows that command signals having key codes for a separate electronic device (e.g., a television 104) will soon be received and, thus, the first electronic device 102 will not ignore such command signals upon receipt. Rather, the first electronic device 102 will prepare itself for performing the process 400 in order to identify a matching key code set and program the first remote control device 112.

The first electronic device 102 may automatically enter the discovery mode, for example, upon receiving a predetermined number (e.g., five or more) of command signals, within a predetermined time period, containing key codes which are not associated with control of the first electronic device 102. For example, a user may press a number of buttons on the second remote control device 114 (which is associated with a television 104), thereby transmitting a number of command signals which may be received by the first electronic device 102. If the number and frequency of received command signals generated from the user's button presses on the second remote control device 114 exceeds a predetermined number and frequency for entry of discovery mode by the first electronic device 102, then the first electronic device 102 may assume that the user intends to enter a remote control programming procedure. Thus, the first electronic device 102 may automatically enter into the discovery mode. In such a case, the first electronic device 102 may ask the user (e.g., by causing a message to be displayed on the television 104) whether entry of a remote control device discovery mode is desired. If yes, the user may enter an acknowledgement, for example, using the first remote control device 112. Alternatively, the first electronic device 102 may enter discovery mode upon the user pressing any additional keys or buttons on the second remote control device 114.

Once in the discovery mode, at block 404 the first electronic device 102 may prompt the user to press one or more keys on the second remote control device 114. The user may be prompted to enter a particular key (e.g., "Please press the 'volume up' key"), or alternatively, the user may be allowed to enter any key at random.

At block 406, the key code associated with the command signal generated by the user's key press on the second remote control device 114 is received and decoded by the first electronic device 102. At block 408, the first electronic device 102 accesses and queries the universal key code database 110 to uniquely identify a matching key code set. That is, the first electronic device 102 searches the universal key code database 110 to uniquely identify a key code set for controlling the second electronic device 104 which may be identified based on the key code received from the second remote control device 114.

At block 410, the first electronic device 102 determines whether a unique key code set has been identified. If yes, then at block 412 the first electronic device 102 programs the first remote control device 112 with the uniquely identified key code set for controlling the second electronic device 104.

If a matching key code set cannot be uniquely identified at block 410, the first electronic device 102, at block 414, analyzes the universal key code database 110 to determine a next key code from which a matching key code set can be uniquely identified, or which will optimally narrow the field of matching key code sets. The analysis may be performed utilizing, for example, an intelligent or dynamic searching, artificial intelligence, heuristics, optimization algorithms and the like. The analysis performed at block 414 is described with reference to FIG. 5, which illustrates hypothetical key code sets which may be stored in the universal key code database 110.

Figure 5:
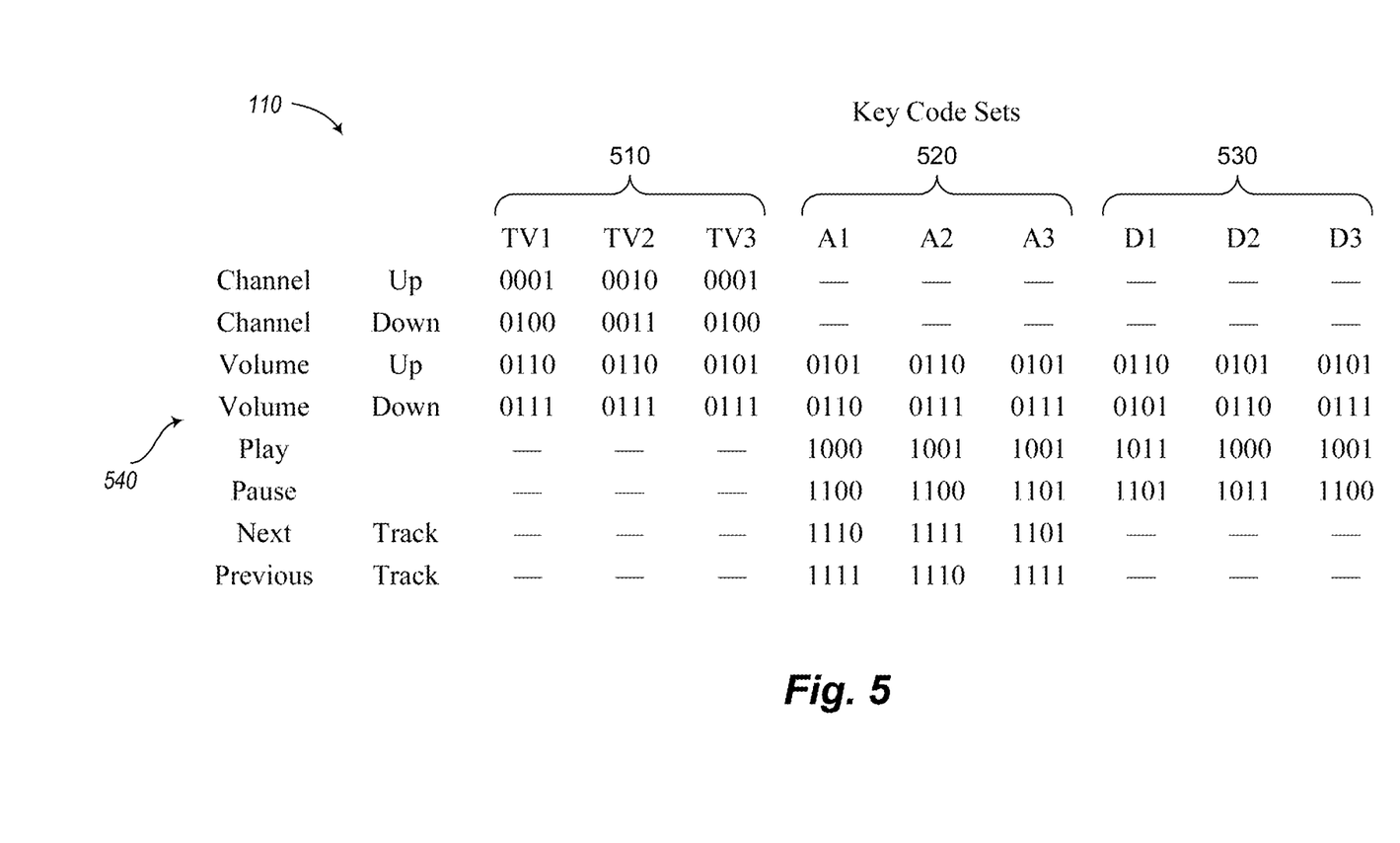
FIG. 5 illustrates hypothetical key code sets which may be stored in a universal key code database, in accordance with one or more embodiments.

As shown in FIG. 5, the universal key code database 110 may include key code sets for various electronic devices, including, for example, key code sets for several models of televisions 510 (e.g., TV1, TV2, TV3), audio receivers 520 (e.g., A1, A2, A3) and/or DVD players 530 (e.g., D1, D2, D3). The universal key code database 110 may be structured or ordered such that similar device types (e.g., televisions) are grouped together, as shown in FIG. 5.

As an example demonstrating the analysis performed by the first electronic device 102 at block 414, assume that the key code received by the first electronic device 102 at block 406 has the value '0001'. In such a case, the first electronic device 102 at block 408 queries the universal key code database 110 and, at block 410, determines that a unique key code set cannot be identified from the received key code. This is because there are multiple potential matching key code sets. For example, both TV1 and TV3 include the key code '0001'. By analyzing the universal key code database 110, at block 414, the first electronic device 102 may identify a type of electronic device (i.e., televisions) associated with the received key code, as only televisions have a key code value of '0001' in the exemplary universal key code database 110 of FIG. 5. Thus, the field of potential matching key code sets may be significantly narrowed in such a case by eliminating all non-television key code sets.

Further, the first electronic device 102 may determine, at block 414, that the field of potential matching key code sets contains only the key code sets for TV1 and TV3. The first electronic device 102 then analyzes the key code sets associated with each of TV1 and TV3 to identify an optimal next key code in order to uniquely identify the associated key code set, or to minimize the number of potential matches. In this example, the first electronic device 102 identifies the "volume up" key as being the optimal next key code, as the "volume up" key is associated with different key codes for each of TV1 (i.e., '0110') and TV3 (i.e., '0101'). In contrast, if the next key code entered were either of "channel down" or "volume down," the first electronic device 102 would not be able to uniquely identify an associated key code set.

Accordingly, at block 416, the first electronic device 102 provides a prompt to the user to press the "volume up" key and, at block 406, the first electronic device 102 receives the key code '0101'. In one or more embodiments, the first electronic device 102 may store or otherwise tag for quick retrieval the key code sets of all potential matching key code sets identified at block 414. Thus at block 408, the first electronic device 102 may query only those potential matching key code sets upon receiving a second or additional key codes at block 406. Upon querying the potential matching key code sets (i.e., key code sets for TV1 and TV3) for the key code '0101', the first electronic device 102 identifies, at block 410, a unique key code set associated with the second remote control device 114. That is, the first electronic device 102 identifies that the second remote control device 114 contains the key code set associated with TV3. Accordingly, at block 412, the first electronic device 102 programs the first remote control device 112, via a programming command, to include the key code set associated with TV3. The first remote control device 112 may thus store the key code set for controlling the second electronic device 104 in data storage 228.

In the simple example as provided with respect to FIG. 5, only nine different devices to be controlled by remote were provided in the example, namely three TVs, three audio receivers, and three DVD players. In a practical, real-world example, the universal database may have up to many thousands of, and in some cases tens of thousands of, devices stored therein with their respective key codes. Accordingly, it may require several iterations of steps 410, 414, and 416 in order to uniquely identify the one device that is to be controlled by the universal remote control. In order to reduce the amount of time that a user spends in pushing different keys, the set-top box uses a heuristic approach in an effort to identify the correct device in the fewest number of keystrokes possible. For example, it may be that, after the first key is pressed, half or more of all the devices stored in memory will be eliminated, since none of them will have that particular key code. As the second key to be pressed, rather than the user selecting some random key which may not further eliminate the choices, the set-top box does an analysis on the remaining devices and their key codes. It will search for and locate a key to be pressed that has a high likelihood of most quickly identifying the particular individual device with the fewest number of keystrokes. For example, upon querying the database of the remaining devices, if it finds that 90% of the devices have the same signal for a subsequent key, such as "channel down," as shown in FIG. 5, then having the user press "channel down" will not further distinguish between a majority of the remaining devices. The algorithm in the set-top box will search for the key code, which can eliminate at least half, and preferably more, of the remaining devices. Namely, the algorithm will locate a second key, which, depending on its output, will serve to eliminate approximately half of the remaining key codes for the second devices. The set-top box will then output the identity of that key on a display, and indicate to the user that they are to press that key next.

Upon the user seeing that key on the display of the television, the set-top box, or some other display, the user can then press that key. Once the set-top box receives the second key they can now eliminate another large set of the remaining key codes as not matching the second device to be controlled. In a subsequent step, this same process will be repeated with a goal to select the third key to be pressed based on the ability to eliminate between 40%-60% of the remaining codes, and preferably, generally about 50%. The code for a third key is then output to the display by the set-top box with instructions from the user to press that key. Once the key is pressed and the code output by the remote control that is received by the set-top box, another series of key codes can be eliminated. This process continues until the unique key code that corresponds to the second remote control has been identified so that the exact identity of the second device which is to be controlled by that remote control has been identified. The desired key code has therefore been determined and can then be programmed into the first remote control so that it becomes a universal remote control.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for programming a first remote control device associated with a first electronic device, comprising:
   receiving, by the first electronic device, a first electronic command signal issued from a second remote control device, the first electronic command signal including a key code indicative of a first key entry on the second remote control device, the second remote control device being associated with a second electronic device;
   accessing, by the first electronic device, a key code database, the key code database storing a plurality of key code sets, each of the plurality of key code sets having a plurality of key codes for controlling at least one electronic device;
   comparing, by the first electronic device, a received first key code to the key code database to identify matching key code sets including the first key code;
   analyzing, by the first electronic device, the matching key code sets to identify a preferred next key entry
   prompting a user of the second remote control device to press a key on the second remote control device corresponding to the identified preferred next key entry;
   identifying a key code set which corresponds to all of the available key entries that the second remote control may output by repeating the comparing, analyzing, and prompting steps until a sufficient number of keys has been identified to know the entire key code set that matches the key code set that controls the second electronic device; and programming the first remote control with the second key code set that permits the first remote control to control both the first electronic device and the second electronic device.

2. The method of claim 1, wherein the first electronic device comprises a set-top box.

3. The method of claim 2, wherein the second electronic device comprises one of: a television, an audio or video receiver, a digital video recorder (DVR) or a digital video disc (DVD) player.

4. The method of claim 1, further comprising:

receiving, by the first electronic device, a second electronic command signal issued from the second remote control device, the second electronic command signal including a key code indicative of the next key entry on the second remote control device;

determining, by the first electronic device, whether a key code set associated with the second remote control device is uniquely identifiable based on the received first and next key entries; and if the key code set associated with the second remote control device is uniquely identifiable, programming the first remote control device to include the key code set associated with the second remote control device.

5. The method of claim 4, wherein if the key code set associated with the second remote control device is not uniquely identifiable, the method further comprising:

analyzing, by the first electronic device, the matching key code sets to identify a preferred second next key entry; and prompting the user of the second remote control device to press a key on the second remote control device corresponding to the identified preferred second next key entry.

6. The method of claim 1, further comprising:

entering, by the first electronic device, a discovery mode, wherein in the discovery mode the first electronic device acknowledges electronic command signals issued from the second remote control device.

7. The method of claim 6, wherein entering, by the first electronic device, a discovery mode comprises:

automatically entering the discovery mode upon receiving a predetermined number of electronic command signals from the second remote control device within a predetermined period of time.

8. The method of claim 6, wherein entering, by the first electronic device, a discovery mode comprises:

receiving, by the first electronic device, a discovery mode initiation command signal from the first remote control device.

9. A remote control programming system, comprising:

a first remote control device associated with a first electronic device, the first remote control device being configured to control the first electronic device; and a second remote control device associated with a second electronic device, the second electronic device being configured to:

receive a first electronic command signal issued from the second remote control device, the first electronic command signal including a key code indicative of a first key entry on the second remote control device;

access a key code database, the key code database storing a plurality of key code sets, each of the plurality of key code sets having a plurality of key codes for controlling at least one electronic device;

compare a received first key code to the key code database to identify matching key code sets including the first key code;

analyze the matching key code sets to identify a preferred next key entry; and prompt a user of the second remote control device to press a key on the second remote control device corresponding to the identified preferred next key entry.

10. The system of claim 9, wherein the first electronic device comprises a set-top box.

11. The system of claim 10, wherein the second electronic device comprises one of: a television, an audio or video receiver, a digital video recorder (DVR) or a digital video disc (DVD) player.

12. The system of claim 9, wherein the first electronic device is further configured to:

receive a second electronic command signal issued from the second remote control device, the second electronic command signal including a key code indicative of the next key entry on the second remote control device;

determine whether a key code set associated with the second remote control device is uniquely identifiable based on the received first and next key entries; and if the key code set associated with the second remote control device is uniquely identifiable, program the first remote control device to include the key code set associated with the second remote control device.

13. The system of claim 12, wherein, if the key code set associated with the second remote control device is not uniquely identifiable, the first electronic device is further configured to:

analyze the matching key code sets to identify a preferred second next key entry; and prompt the user of the second remote control device to press a key on the second remote control device corresponding to the identified preferred second next key entry.

14. The system of claim 9, wherein the first electronic device is further configured to:

enter a discovery mode wherein the first electronic device acknowledges electronic command signals issued from the second remote control device.

15. The system of claim 14, wherein the first electronic device is configured to automatically enter the discovery mode upon receiving a predetermined number of electronic command signals from the second remote control device within a predetermined period of time.

16. The system of claim 14, wherein the first electronic device is configured to enter the discovery mode upon receiving a discovery mode initiation command signal from the first remote control device.

17. A non-transitory computer-readable storage medium having computer executable instructions thereon that, when executed by at least one computer processor of a first electronic device that is associated with a first remote control device, cause the following method to be performed:

receiving, by the first electronic device, a first electronic command signal issued from a second remote control device, the first electronic command signal including a key code indicative of a first key entry on the second remote control device, the second remote control device being associated with a second electronic device;

accessing, by the first electronic device, a key code database, the key code database storing a plurality of key code sets, each of the plurality of key code sets having a plurality of key codes for controlling at least one electronic device;

comparing, by the first electronic device, a received first key code to the key code database to identify matching key code sets including the first key code;

analyzing, by the first electronic device, the matching key code sets to identify a preferred next key entry; and prompting a user of the second remote control device to press a key on the second remote control device corresponding to the identified preferred next key entry.

18. The non-transitory computer-readable storage medium of claim 17, wherein the computer executable instructions, when executed by the at least one computer processor, further cause the following to be performed:

receiving, by the first electronic device, a second electronic command signal issued from the second remote control device, the second electronic command signal including a key code indicative of the next key entry on the second remote control device;

determining, by the first electronic device, whether a key code set associated with the second remote control device is uniquely identifiable based on the received first and next key entries; and if the key code set associated with the second remote control device is uniquely identifiable, programming the first remote control device to include the key code set associated with the second remote control device.

19. The non-transitory computer-readable storage medium of claim 18, wherein the computer executable instructions, when executed by the at least one computer processor, further cause the following to be performed if the key code set associated with the second remote control device is not uniquely identifiable:

analyzing, by the first electronic device, the matching key code sets to identify a preferred second next key entry; and prompting the user of the second remote control device to press a key on the second remote control device corresponding to the identified preferred second next key entry.

20. The non-transitory computer-readable storage medium of claim 17, wherein the computer executable instructions, when executed by the at least one computer processor, further cause the following to be performed:

entering, by the first electronic device, a discovery mode, wherein in the discovery mode the first electronic device acknowledges electronic command signals issued from the second remote control device.

* * * * *